Jan. 10, 1961 G. L. HOBROUGH 2,967,954

DIODE LATTICE MULTIPLIER WITH INHERENT LIMITING

Filed March 10, 1959

Inventor
GILBERT L. HOBROUGH
by: Cavanagh & Norman 2,967,954
Patented Jan. 10, 1961

2,967,954

DIODE LATTICE MULTIPLIER WITH INHERENT LIMITING

Gilbert Louis Hobrough, Scarborough, Ontario, Canada, assignor, by mesne assignments, to Hunting Survey Corporation Limited, Toronto, Ontario, Canada Filed Mar. 10, 1959, Ser. No. 798,494

4 Claims. (Cl. 307—88.5)

This invention relates to a diode lattice multiplier system and to the method of processing two signals therewith to evaluate the coherence of said signals.

In circumstances where the multiplication of two signals is required for the purpose of obtaining a multiplied signal which is a function of the similar components of the original signals, known multipliers utilized for such purpose, may be regarded as of the proportional type, see Glassford Fundamentals of Television Engineering, McGraw-Hill, 1955. Prior art electronic multipliers effect multiplication of a pair of coherent signals to provide a multiplied output signal of a form and amplitude responsive generally to the large amplitudes present in the original signals. Therefore, the values of the original signals near zero contribute little to the output. In general, known proportional multipliers are either complex devices employing intermediate carrier or gating methods or suffer from severe drift and unbalance defects.

The multiplication of two similar uniformly shaped signals by a multiplier of the prior art delivers an output signal in which the information content is a function of the information in the high amplitude portions of the original wave forms at spaced points in time called sample points occurring at regions of high amplitude. Where the input wave forms are of non-uniform character, the sample points will not be equally spaced in time and have an average spacing which may or may not be small enough to allow a large portion of the information to be extracted. Thus the number of sample points will not be sufficiently numerous and hence sufficiently closely spaced for high efficiency extraction of information except for very narrow band input signals as, for example, two sine waves. The complex circuitry and bulk of prior multiplier systems has to some degree been circumvented by the use of so called bridge multipliers of a kind disclosed in U.S. Patent 2,676,206 to W. R. Bennett et al., issued April 20, 1954. Prior bridge multipliers are characterized by substantial drift and other disadvantages.

As contrasted with the processing of information represented by the higher amplitude portions of the wave forms, applicant herein has discerned the feasibility of extracting that information in a wave form represented by the zero crossing of the wave form in such manner that the zero crossings of two signals to be processed become the sample points for the information desired. In general, therefore, the spacing of such naturally occurring sample points may not be sufficiently numerous to permit a high efficiency of information except when processing from narrow band signals. Thus according to the present invention the limitations of information extraction may somewhat correspond to those limitations experienced in the extraction of amplitude information by processes of the prior art.

It is the main object of this invention to provide a multiplier of highly stable character adapted to extract essentially only signal information at or near the zero crossings of input wave forms.

It is a further object of the invention to provide a stable system for multiplying two input signals in which the latter are caused to be limited to a degree rendering significant substantially only that information in the input wave forms occurring at or near the zero crossings thereof.

According to this invention two signals are processed essentially in the regions of the zero crossings thereof by the novel diode lattice multiplier system herein whereby the resulting output signal is effectively a measure of the portion of time during which the two signals have the same polarity. When both signals are of the same phase the polarity of the output signal is positive. If the phase of either of the signals is reversed then the polarity of the output signal will be negative. Accordingly the direct current component of the output signal increases with an increase in similarity of the input signals in such manner that a maximum direct current signal represents identical input signals and hence maximum coherence.

Other objects of the invention will be apparent from a study of the following specification taken in conjunction with the accompanying drawing.

Figure 1 discloses in electronic schematic form a diode lattice multiplier of the invention.

Figure 1:
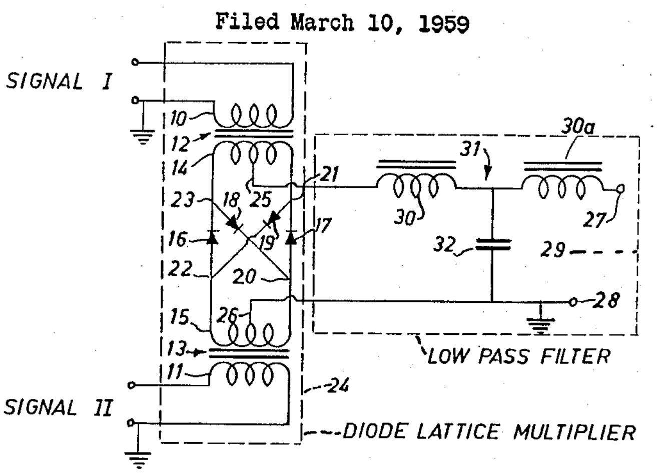

The diode lattice multiplier of the invention exerts a limiting action on the input signals by virtue of the generator impedence of the signal sources being high in relation the forward resistance of the diodes as seen through the transformers 12 and 13. Thus, in the drawing, the signals 1 and 2 are applied to the input windings 10 and 11 respectively of transformers 12 and 13, the output windings 14 and 15 of the latter being connected to define a multiplying circuit embodying the diodes 16, 17, 18 and 19. Starting at any junction in the diode circuit and tracing through the diodes in series, say from junction 20, one may proceed through diode 17 to junction 21, through diode 19 to junction 22, through diode 16 to junction 23 and through diode 18 back to junction 20, while tracing through the diodes in the same direction.

The "diode lattice" multiplier hereof embodies the diode circuit described in combination with the transformers disclosed, so that the complete circuit thereof encompassed by chain lines 24 may be described as a "diode lattice" multiplier herein. The output of said multiplier is obtained from the centre taps 25 and 26 respectively of output windings 14 and 15 and is communicated to the output terminals 27 and 28 through a "series input" low pass filter defined by chain lines 29.

By the term "series input" as applied to low pass filters is meant a filter having a choke or series resistance input such as a T configuration filter, or an inverted L configuration filter in which the base leg of the L embodies the input terminal resistance or choke of the filter. Thus in Figure 1 the term "series input low pass filter" refers to the choke 30 in the T filter configuration 31 containing the condenser 32 and the remaining series choke 30*a*. A series input filter, as contrasted with a shunt input filter in which the shunting element must be a condenser for low pass applications, embodies inherent characteristics contributing to the desired limiting action and maintenance of the same within close limits in the output signal.

The diodes utilized must be matched with precision. For this purpose, the invention contemplates the use of silicon diodes selected by trial to a tolerance within one percent of the operating portion of the characteristic curve. The silicon diode as presently commercially available is reliable and free from zero drift of spurious output.

Figure 2:
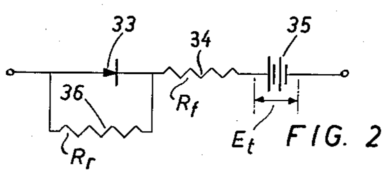
Figure 2 is the equivalent basic circuit of a semi-conductor diode.

The equivalent basic circuit of a silicon diode is illustrated in Figure 2 in which a diode element 33 is connected in series with the forward impedance of the diode 34 and battery 35, said element being shunted by the reverse impedance 36. The silicon diode is characterized by a very high ratio of reverse impedance to forward impedance to the degree that the forward impedance $R_f$ may for present purposes be regarded as equal to zero while the reverse impedance may be regarded as equal to infinity. The battery 35 represents the threshold at which conduction occurs through the diode. All semi-conductor diodes have a threshold operating characteristic at which activation or operation begins. Silicon diodes possess this characteristic to a high degree and exhibit a low ohmic resistance in relation to the threshold voltage as forward conduction sets in. Below the threshold operating voltage and extending into the negative non-conducting regions, the impedance of the silicon diode is very high.

According to this invention, in the arrangement of such silicon diodes in bridge multiplier array, described herein as a diode lattice multiplier having regard to its distinctively different operating characteristic from former known multipliers, the output is limited to the threshold voltage for positive going signal in one portion of the bridge and is likewise limited to the threshold voltage for negative going signal in the other portion of the bridge. In this way an inherent limiting action is effected in the multiplying function in such manner as to achieve highly stable and satisfactory multiplying characteristics.

Figures 3, 4:
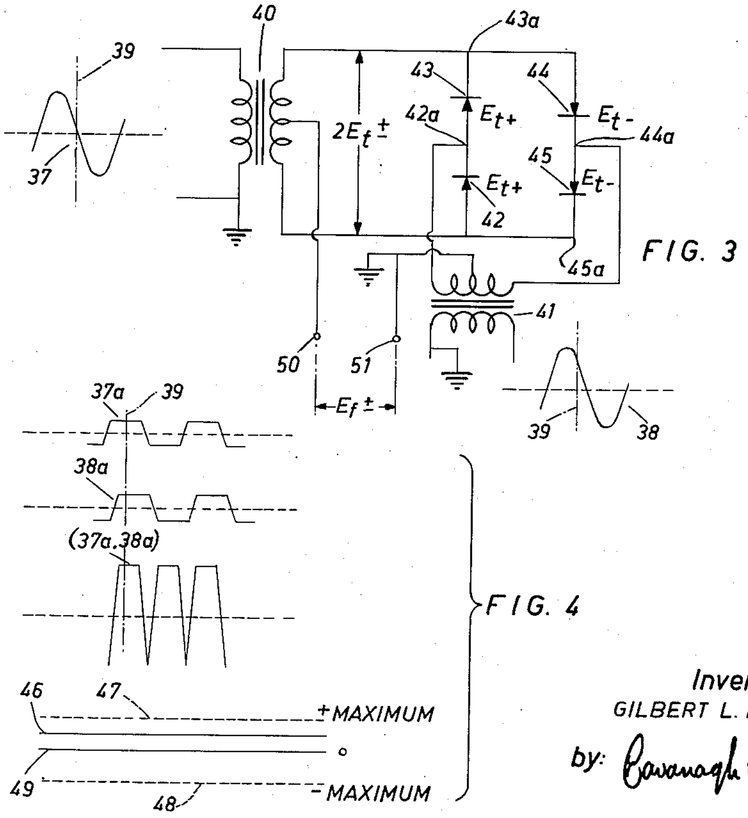
Figure 3 is a general schematic of a multiplier of the invention illustrating the application of input signals thereto.
Figure 4 is a wave form progression diagram of the processing of the input signals in Figure 3 to the output terminals of the circuit thereof.

Thus in Figure 3, two sine waves 37 and 38, by way of example, are shown as input signals of less than 90 degrees difference in phase with respect to the reference point in time 39. The input signal windings of the bridge transformers 40 and 41 are coupled by their secondaries in bridge connection to the ring series conducting silicon diodes 42, 43, 44 and 45 having two pairs of opposite junctions (42*a*, 44*a*) and (43*a*, 45*a*). In order to provide the desired limiting action discussed herein, it is necessary to adjust the ratio of primary to secondary windings of transformers 40 and 41 such that the signal source impedance as seen at the secondary of each transformer is equal to the geometric mean of the forward and back impedances of the two diodes in series.

Accordingly the turns ratio of each transformer should conform generally to the following relation:

$$\frac{P}{S}=\sqrt{\frac{R_{gs}}{\sqrt[2]{R_r R_f}}}$$

where:

| | Typical values, ohms |
|---|---|
| $R_{gs}$ is the signal source impedance | $10^3$ |
| $R_r$ is the reverse resistance of the diode | $10^6$ |
| $R_f$ is the forward resistance of the diode | $10^2$ |

By virtue of the above noted relation in combination with the characteristics of semi-conductor diodes of the silicon type as described, the wave forms as shown in Figure 4 might for convenience be represented as being of limited form as at 37 and 38 which, when multiplied, are represented by (37*a*.38*a*) of an average value which may be represented by a line of direct current potential 46. It would be apparent that the direct current line of potential 46 would rise to a maximum positive value 47, were the sine wave input signals identical in phase. If the sine wave input signals were 180 degrees out of phase, the output signal would reach the negative potential line 48. Were the sine wave input signals either 90 degrees or 270 degrees out of phase, the output would be represented by the zero potential line 49.

In order to maintain the desired limiting action, the load impedance for the output terminals 50 and 51 of the multiplier Figure 3 should be adjusted so that the load current is small compared to the current through the diodes under all conditions otherwise there will be a loss of control on the limiting action in the output signal. Therefore, the current through the load should be less than preferably about one-half the peak value of the signal current through the diodes. Accordingly a "series input" low pass filter should be used to present a sufficiently high impedance load at all frequencies to maintain the desired limiting action.

Careful selection of semi-conductor diodes affords a highly stable and simple form of multiplier in which the diodes have an effective limiting action whereby values of the wave form near the zero crossings are rendered significant in information utilization. The low pass filter of the invention should have as low an upper frequency limit as is consistent with the permissible time constant of the filter network and should thus be adjusted to the requirements of the time delay introduced by inherent delay characteristics of the filter network. As a result the combined effect of a multiplier and filter of the invention in the simplified form of a diode lattice circuit set forth enables the efficient utilization of significant information from the original wave forms by novel methods in a balanced and drift free system adapted for miniature fabrication.

The method of this invention concerns the processing of two input signals having frequency components to obtain an output signal representative of the information common to both signals. The method is practiced by accomplishing a limiting of the input signals as described to render significant substantially only the information contained in the input signals at and near zero crossings thereof.

The ring multiplier concept with semi-conductor diodes as described accomplishes the establishment of a series ring current conducting path of low impedance in one direction of current flow therethrough and of relatively infinite impedance in the opposite direction of current flow therethrough. The input signals are isolated from the series ring current conducting path by indirect coupling preferably in the form of the coupling transformers disclosed. The input signals are therefore indirectly coupled across opposite points in the series ring current conducting path which for purposes of description may be regarded as 180 degrees apart in the ringlike concept of such path. The corresponding indirect coupling of the other input signal can therefore be conveniently described as being introduced to the series ring current conducting path across points therein likewise spaced 180 degrees but additionally spaced 90 degrees from the points of introduction of the first mentioned input signal. As described above, the limiting action is controlled and rendered more perfect by controlling the effective impedence of the source of the input signals as it effectively appears at the coupling points in the series ring current conducting path to a value substantially equal to the geometric mean of the forward and reverse impedance of the current conducting path measured through 180 degrees thereof. The desired output signal may then be extracted from points of mean signal potential between the coupling points of the series ring current conducting path as for example the centre taps of the secondary windings described.

The invention also generally concerns improvements in electronic signal multipliers by virtue of which a novel diode lattice multiplier as set forth herein is taught and which is of a kind adapted for the multiplication of two electrical signals having a signal source impedence. As set forth the multiplier of the invention comprises a diode lattice in the form of four semi-conductor diodes arranged in a series ring and having two pairs of opposite junctions between said diodes, each of the diodes having a forward impedence and reverse impedence and all of said diodes having a common operating portion on their characteristic operating curve within about one percent. Two input transformers are utilized for isolated coupling of the input signal to the series ring, the transformers each having a centre tap secondary winding and including leads for connecting the secondary winding to one of said pairs of opposite junctions. The other secondary of the other transformer connects across the other pair of junctions of the series ring. Connections are then provided for extracting a multiplied output signal from the centre taps of the secondary windings and transformer ratios or other impedance matching means are utilized to render the effective source impedence of the input signals at the secondary windings substantially equal to the geometric mean of the forward and reverse impedences of two of the diodes in series thereby limiting the input signals and rendering significant the information content of the signals near the zero crossing thereof.

What I claim is:

1. An electronic multiplier for multiplying two input electrical signals having frequency components and comprising: a diode lattice in the form of four semi-conductor diodes each having a cathode and an anode and means connecting said diodes electrically in a series ring having two pairs of opposite junctions; two transformers each having a centre tapped secondary winding; means connecting one of said secondary windings across one pair of opposite junctions; means connecting the said other secondary winding across the other pair of opposite junctions; an input signal primary winding for each of said transformers of a turns ratio in relation to the secondary winding thereof substantially equal to $$\sqrt{\frac{R_{gs}}{\sqrt[2]{R_r R_f}}}$$

where:

$R_{gs}$ is the signal source impedence
$R_r$ is the reverse resistance of the diode
$R_f$ is the forward resistance of the diode;

and means for extracting an output signal from centre taps of said secondary windings.

2. An electronic multiplier for multiplying two input electrical signals having frequency components and comprising: a diode lattice in the form of four silicon diodes each having a cathode and an anode and means connecting said diodes electrically in a series ring having two pairs of opposite junctions; two transformers each having a centre tapped secondary winding; means connecting one of said secondary windings across one pair of opposite junctions; means connecting the said other secondary winding across the other pair of opposite junctions; an input signal primary winding for each of said transformers of a turns ratio in relation to the secondary winding thereof substantially equal to $$\sqrt{\frac{R_{gs}}{\sqrt[2]{R_r R_f}}}$$

where:

$R_{gs}$ is the signal source impedence
$R_r$ is the reverse resistance of the diode
$R_f$ is the forward resistance of the diode;

and means for extracting an output signal from centre taps of said secondary windings.

3. An electronic multiplier for multiplying two input electrical signals having frequency components and comprising: a diode lattice in the form of four semi-conductor diodes each having a cathode and an anode and means connecting said diodes electrically in a series ring having two pairs of opposite junctions; two transformers each having a centre tapped secondary winding; means connecting one of said secondary windings across one pair of opposite junctions; means connecting the said other secondary winding across the other pair of opposite junctions; an input signal primary winding for each of said transformers of a turns ratio in relation to the secondary winding thereof substantially equal to $$\sqrt{\frac{R_{gs}}{\sqrt[2]{R_r R_f}}}$$

where:

$R_{gs}$ is the signal source impedence
$R_r$ is the reverse resistance of the diode
$R_f$ is the forward resistance of the diode;

means for extracting an output signal from centre taps of said secondary windings; and a series input low pass filter for filtering said output signal and of a current demand less than about one-half the peak value of signal current through said diodes.

4. An electronic multiplier for multiplying two input electrical signals having frequency components and comprising: a diode lattice in the form of four silicon diodes each having a cathode and an anode and means connecting said diodes electrically in a series ring having two pairs of opposite junctions; two transformers each having a centre tapped secondary winding; means connecting one of said secondary windings across one pair of opposite junctions; means connecting the said other secondary winding across the other pair of opposite junctions; an input signal primary winding for each of said transformers of a turns ratio in relation to the secondary winding thereof substantially equal to $$\sqrt{\frac{R_{gs}}{\sqrt[2]{R_r R_f}}}$$

where:

$R_{gs}$ is the signal source impedence
$R_r$ is the reverse resistance of the diode
$R_f$ is the forward resistance of the diode;

means for extracting an output signal from centre taps of said secondary windings; and a series input low pass filter for filtering said output signal and of a current demand less than about one-half the peak value of signal current through said diodes.

References Cited in the file of this patent

UNITED STATES PATENTS

| | | |
|---|---|---|
| 2,881,312 | Ressler | Apr. 7, 1959 |
| 2,902,219 | Wilcox | Sept. 1, 1959 |